Dec. 16, 1958   W. E. SIMMONS   2,864,181
DITCHER
Filed Aug. 19, 1955
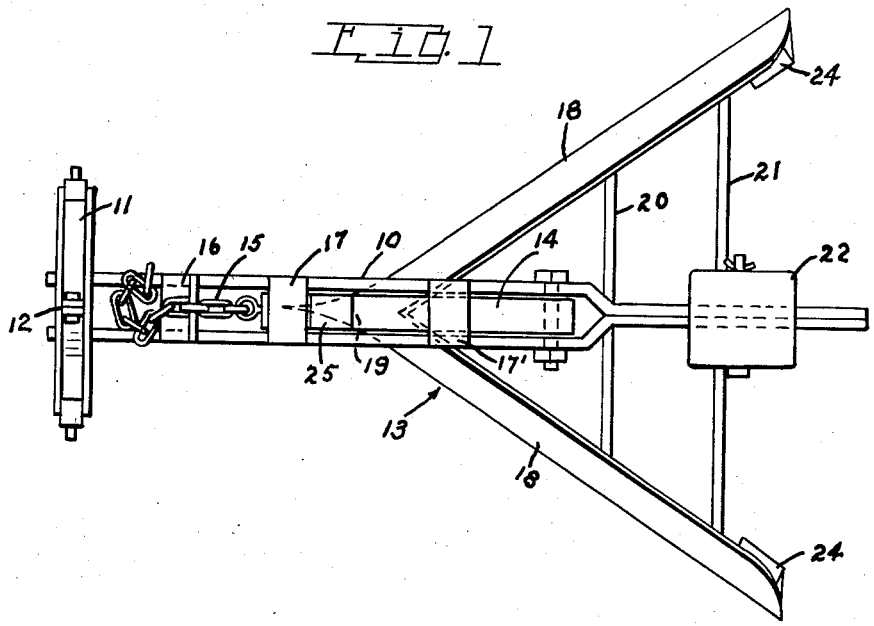
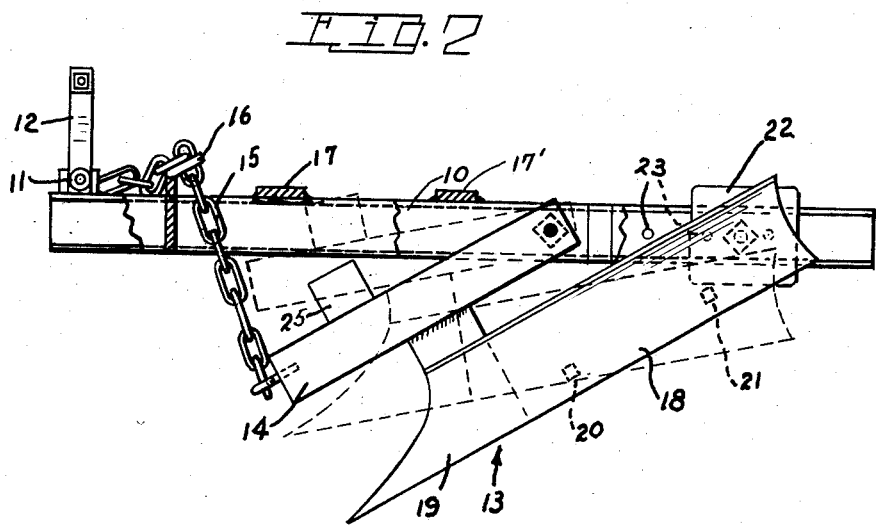
INVENTOR
WILLIAM E. SIMMONS
BY J.B.Dickman Jr.
ATTORNEY

United States Patent Office 2,864,181
Patented Dec. 16, 1958

2,864,181

DITCHER

William E. Simmons, Palatka, Fla.

Application August 19, 1955, Serial No. 529,453

4 Claims. (Cl. 37—98)

This invention relates to improvements in ditchers and adjusting means for controlling the depth and width of the ditch to be cut.

Ditchers now used are of two main types, one type being carried on two wheels which are adjustably mounted on a ditcher frame with provisions for raising or lowering the wheels and thus controlling ditcher digging depth, etc. The other type is without wheels and the ditcher is provided with a frame with means provided to attach and operate by direct mounting on a tractor provided with three point hook up means.

The principal object of my invention is to provide an additional means of quick adjustments whereby the ditcher can be adjusted instantly by relocation of a depth control chain to make a drainage ditch, irrigation ditch or fire line as deep or as wide as required within the limits of the size and weight of the ditcher and the power of the tractor to which the ditcher is attached and which by location of the center of gravity will cause the ditcher point to swing upward to its highest position and retain that position so long as the point does not contact the soil. This will save much time when turning at the end of a row or when the ditcher is being transported from place to place. The adjustment of the ditcher blade per se is in addition to the tractor lift, which may lift the draw bar to any height within the limits of movement of the lift.

A further object is to provide a simple pivotal suspension for the plow on the draw bar at a point behind the nose but ahead of the center of gravity of the plow, and means for limiting the depth to which the nose may swing whereby the plow share will be steadied in holding its adjusted depth.

Other and more specific objects will appear in the following detailed description of the present invention, taken together with the accompanying drawing, wherein:

Figure 1 is a top plan view of a ditcher illustrating one preferred form of the present invention, and Figure 2 is a side view of the ditcher partly cut away to show internal parts.

The present ditcher comprises a draw bar 10 which may be composed of two spaced channel members drawn together at their rear ends to provide a rigid strong frame. A cross lift bar 11 and a vertical bar 12 are welded together and to the top of the draw bar as shown. This is adapted for connection to a three point hitch on a tractor that has means for raising and lowering the hitch so that the depth of the ditch to be cut may be adjusted after the plow is first lowered to bite into the soil.

The plow 13 is fixed to a beam 14 that is pivoted to the draw bar 10 near its rear end such that the center of gravity of the plow 13 and the beam 14 is rearward of the pivot. One end of a chain 15 is attached to the front end of beam 14 and the other end of the chain 15 is adjustably attached in a link notch in a bracket 16 mounted on the draw bar, to limit the amount of swing of the beam away from the draw bar to that which will be permitted by such adjustment. A stop plate 17 welded across the top of the draw bar determines the upper limit of this swing, this stop plate also giving added strength and preventing the spreading of the draw bar.

The plow is provided with a pair of wings 18 extending a V-arrangement in continuation of the surfaces on the sides of the nose 19 of the plow, and struts 20 and 21 are fixed between the wings for reinforcement purposes. These wings guide the soil cut from the ditch over onto the sides of the ditch, and provide the greatest width to the ditch when the plow is held substantially horizontal by the limiting chain 15, that is when pulled up so that the beam 14 is right up against the stop plate 17. This is the position normally maintained by the plow when not plowing, because its center of gravity is behind the suspension pivot of beam 14. For deeper and narrower cuts, the required number of lengths of the chain is released to permit the wider portion of the V of the wings to extend out of the ground, and the plow point to enter the ground at a more acute angle. The beam 14 is provided with an element 25 that keeps beam 14 in proper alignment. To start a cut with this ditcher, it is merely necessary to lower the hitch until the point of the nose of the plow starts digging. The hitch is then raised to the proper level after the nose has reached the full depth permitted by the limit chain. If the chain is not properly adjusted for the desired width of ditch at this depth, it may be readjusted. To readjust it, the ditcher may be pushed rearward slightly to raise the nose of the plow and release the chain so it may be readjusted.

The weight 22 on the rear of the draw bar is selectively bolted to any one of the axially spaced bolt holes 23, not only to add to the downward force of the draw bar 10 provided by the three point hitch but to stabilize this force and reduce shocks of the reacting force of the plow transmitted to the three point hitch.

The wings 18 are provided with additional weights 24 near their rear ends as required to bring the center of gravity of the plow back of the suspension pivot of beam 14.

The ditcher built in the manner described above will maintain a more even cut and produce a smoother ditch of the required depth and width, than the present conventional ditchers. It is much simpler yet sturdier in construction even though lighter in overall weight.

Various modifications in the form and arrangement of details may be made without departing from the spirit and scope of the present invention, as defined in the appended claims.

What is claimed is:

1. A ditcher comprising; a draw bar, means on said bar connectable to a tractor for lifting movements of said bar, a V-shaped plow having a sharp pointed nose and a support beam pivotally suspended for free swinging movement from said draw bar, the center of gravity of the plow being rearward of said pivot and the nose being forward thereof, stop means on said draw bar for limiting the forward swing of said plow, and flexible limit means connected between said draw bar and said support beam for limiting the rearward swing of said plow on said draw bar.

2. A ditcher as defined in claim 1, said limit means comprising a flexible chain adjusting member attached to the front of said support beam and a chain link holding bracket on said draw bar for adjustably holding said chain whereby said plow nose may dig into the earth to a depth limited by the adjusting chain member.

3. A ditcher as defined in claim 2 said draw bar being made of two spaced channel members, said beam being pivoted to swing into said space when the forward swing of the plow is at its limit.

4. A ditcher as defined in claim 3 said stop means comprising a stop plate fixed across the top of said channel members near the forward end of said beam.

References Cited in the file of this patent

UNITED STATES PATENTS

| | | |
|---|---|---|
| 390,201 | Cable | Oct. 2, 1888 |
| 507,913 | Larimer | Oct. 31, 1893 |
| 992,727 | Marsillii | May 16, 1911 |
| 2,527,613 | Zagurski | Oct. 31, 1950 |
| 2,598,514 | Denning | May 27, 1952 |
| 2,786,404 | Gardner | Mar. 26, 1957 |